United States Patent
Döring et al.

(10) Patent No.: US 7,186,076 B2
(45) Date of Patent: Mar. 6, 2007

(54) EXHAUST GAS TURBINE

(75) Inventors: Volker Döring, Stuttgart (DE);
Hans-Dieter Hensel, Vaihingen (DE);
Peter Schick, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 108 days.

(21) Appl. No.: 11/032,311

(22) Filed: Jan. 10, 2005

(65) Prior Publication Data
US 2005/0169747 A1  Aug. 4, 2005

Related U.S. Application Data

(63) Continuation-in-part of application No. PCT/EP03/05620, filed on May 28, 2003.

(30) Foreign Application Priority Data

Jul. 10, 2002 (DE) ............................... 102 31 109

(51) Int. Cl.
*F01D 17/16* (2006.01)
(52) U.S. Cl. ..................................... 415/158
(58) Field of Classification Search ................ 415/150, 415/151, 157, 158, 167; 60/602
See application file for complete search history.

(56) References Cited

U.S. PATENT DOCUMENTS

| 5,267,829 | A | * | 12/1993 | Schmidt et al. | ............... 415/48 |
|---|---|---|---|---|---|
| 5,910,000 | A | * | 6/1999 | Schade et al. | ............... 415/158 |
| 6,374,611 | B2 | * | 4/2002 | Doring et al. | ............. 60/605.1 |
| 6,443,696 | B1 | * | 9/2002 | Erdmann et al. | ........... 415/157 |
| 6,669,441 | B2 | * | 12/2003 | Bertnik et al. | .............. 415/158 |

FOREIGN PATENT DOCUMENTS

| DE | 31 51 414 | 5/1983 |
|---|---|---|
| DE | 43 32 400 | 8/1993 |
| DE | 196 45 388 | 5/1998 |
| DE | 198 16 645 | 10/1999 |

* cited by examiner

*Primary Examiner*—Christopher Verdier
(74) *Attorney, Agent, or Firm*—Klaus J. Bach

(57) ABSTRACT

In an exhaust gas turbine for a turbocharger of an internal combustion engine, including a housing with an inlet passage for conducting exhaust gas onto a turbine wheel supported in the housing, a guide vane structure movable into, and out of, an annular space of the inlet passage around the turbine wheel, an operating mechanism for moving the guide vane structure is provided which includes a cylinder, a ring provided with axial passages disposed around an inner sleeve, the guide vane structure being connected to one end of claws movably disposed in the axial passages and at least one of the claws being connected at its other end to the operating mechanism.

7 Claims, 2 Drawing Sheets

EXHAUST GAS TURBINE

This is a Continuation-In-Part Application of International Application PCT/EP03/05620 filed May 28, 2003 and claiming the priority of German application 102 31 109.9 filed Jul. 10, 2002.

BACKGROUND OF THE INVENTION

The present invention relates to an exhaust gas turbine for a turbocharger of an internal combustion engine with a turbine wheel arranged in a turbine housing including inlet passages for admitting exhaust gas to the turbine wheel and a flow control arrangement comprising a vane ring slidably supported around the turbine wheel so as to be movable by an operating mechanism into, and out of, the inlet passages for controlling the exhaust gas flow to the turbine wheel.

DE 196 45 388 A1 discloses such an exhaust gas turbine wherein a guide vane sleeve is arranged between a spiral inlet passage and a turbine wheel so as to be movable axially into, and out of, an annular space in the turbine housing. At its free front end, the guide vane sleeve includes a cover ring which, in the retracted position of the guide vane sleeve, covers an annular space between the turbine housing and an inner guide structure for the guide vane sleeve. In the extended sections of the guide vane sleeve, the cover ring reduces the axial length of the annular space and forms a flow resistance in the form of a sharp-edged step in the contour of the spiral inlet passage. The step generates turbulence in the inlet flow which results in an efficiency loss of the turbine.

DE 31 51 414 A1 discloses an exhaust gas turbine for a turbocharger of an internal combustion engine with a turbine housing having an inlet passage and a turbine wheel disposed in the turbine housing. In the area of the outer circumference of the turbine wheel, a guide vane sleeve is slidably supported and is movable by an operating mechanism into, and out of, an annular space formed in the turbine housing around the turbine wheel. The operating mechanism comprises an operating cylinder which is mounted onto a support structure which is connected in the area of the outer circumference of a cylindrical inner part co-axially surrounding the turbine outlet and which is directly or indirectly connected to the guide vane sleeve.

DE 198 16 645 A1 discloses an exhaust gas turbine for a turbocharger of an internal combustion engine with a turbine wheel disposed in a turbine housing including an inlet channel guiding the exhaust gas to the turbine wheel. A guide vane sleeve extends in an annular space around the turbine wheel and is axially movable into and out of the annular space by means of a piston rod and a pneumatic cylinder.

The operating mechanism however is relatively complicated and expensive.

It is the object of the present invention to provide an operating mechanism for the adjustment of the guide vanes which is simple, inexpensive and reliable.

SUMMARY OF THE INVENTION

In an exhaust gas turbine for a turbocharger of an internal combustion engine, including a housing with an inlet passage for conducting exhaust gas onto a turbine wheel supported in the housing, and a guide vane structure movable into, and out of, an annular space of the inlet passage around the turbine wheel, an operating mechanism for moving the guide vane structure is provided which includes a cylinder, the cylinder being disposed in parallel alignment with the guide vane structure, and a ring provided with axial passages disposed around an inner sleeve, the guide vane structure being connected to one end of pawls or lugs movably disposed in the axial passages and at least one of the claws being connected at its other end to the operating mechanism.

Since the operating cylinder is indirectly or, respectively, directly connected to the guide vane sleeve, the linear movement of the operating cylinder or, respectively, the piston rod of the operating cylinder can be linearly transferred to the guide vane sleeve so that an accurate linear displacement of the guide vane sleeve is facilitated. Furthermore, with this kind of operational set up, the overall arrangement is simplified and can be manufactured relatively inexpensively since fewer components are required.

It is furthermore advantageous if at least one pawl or lug is provided at the outer circumference of the guide vane sleeve with a joint by way of which the piston rod of the operating cylinder is connected to the guide vane sleeve.

If two or more such pawls are provided, they should be evenly spaced around the circumference of the guide sleeve which, at its front end, is provided with the guide vane ring.

It is advantageous if the guide vane ring comprises first and second end structures which are interconnected by the guide vanes extending therebetween.

In accordance with a preferred embodiment, the turbine housing is provided with a recess for receiving the end ring structures.

In connection with the present invention, it is very advantageous if the joint by which a cylinder is connected to the guide vane sleeve is a ball joint by way of which a pawl or lug is joined to the piston rod of an operating cylinder.

It is also advantageous if a ring co-axially surrounding the guide vane sleeve is firmly connected to the guide vane sleeve.

Further advantages and features of the invention will be described below on the basis of the accompanying drawings.

DESCRIPTION OF A PREFERRED EMBODIMENT

Figure 1:
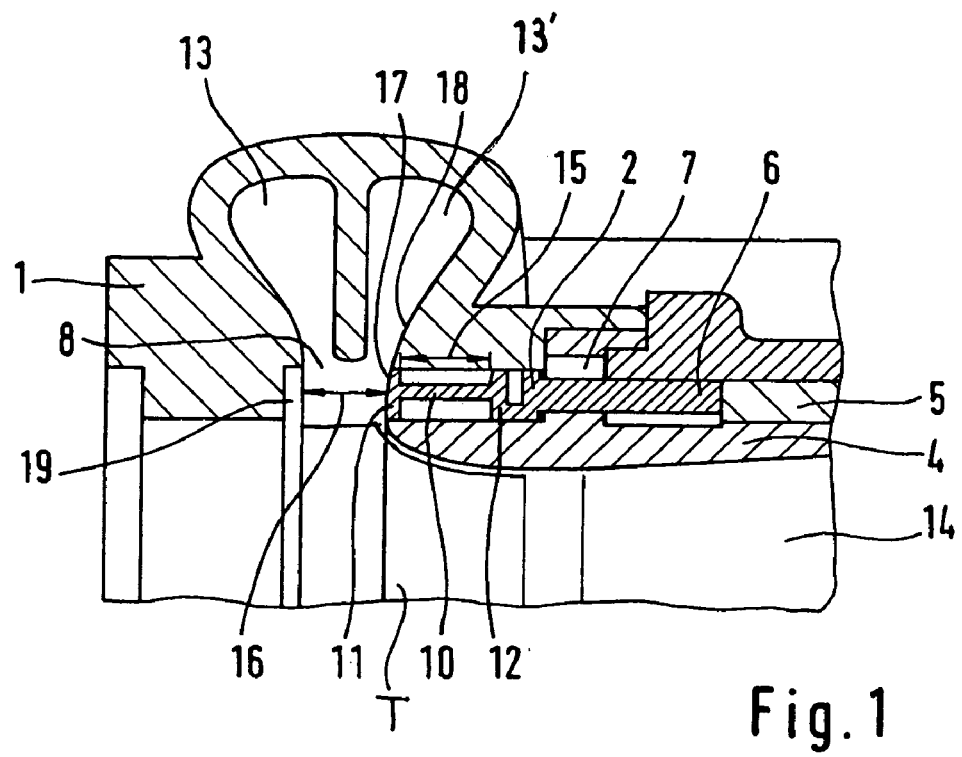
FIG. 1 is a partial sectional view of an exhaust gas turbine with an adjustable guide vane structure in a retracted position.

FIG. 1 shows a section of a turbine housing 1 with two spiral inlet passages 13, 13' leading to an annular space 8 disposed radially around a turbine wheel T, through which the exhaust gases entering the turbine via the inlet passages 13, 13' leave the turbine housing 1 via the axial discharge passage 14.

Figure 2:
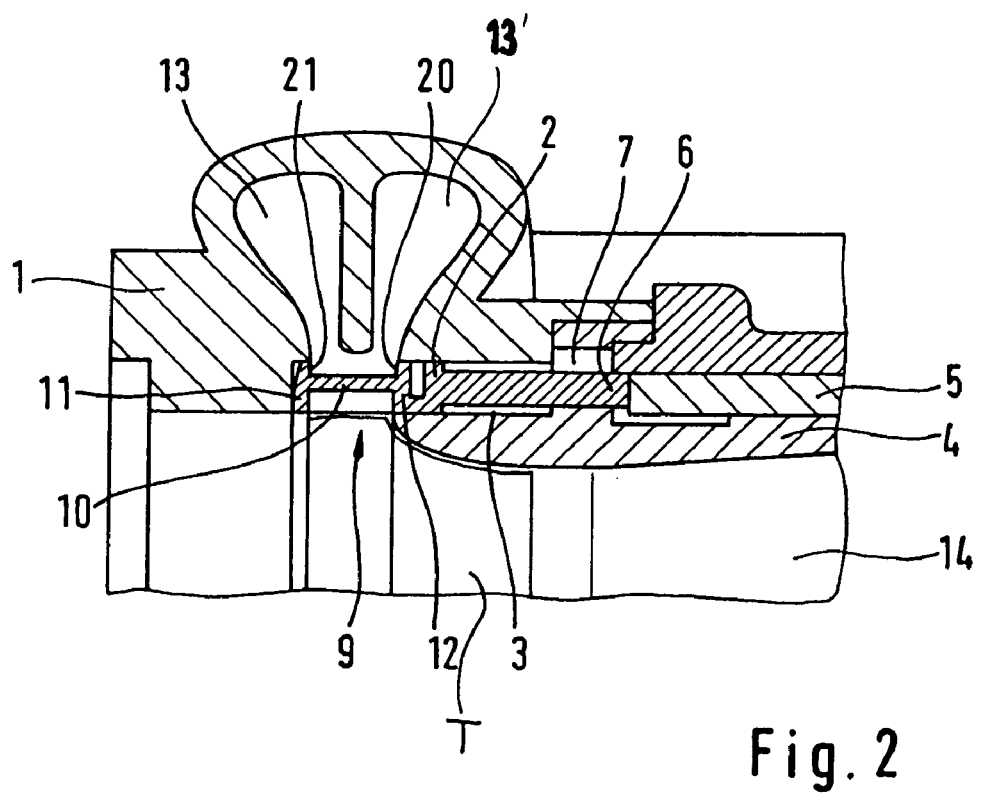
FIG. 2 is a partial sectional view of the exhaust gas turbine with the adjustable guide vane structure in an operative position.

In an annular gap 3 between the turbine housing 1 and an exhaust flow guide structure 4, an annular, axially movable slide sleeve 2 is arranged which carries a guide vane structure 9 with flow guide vanes 10. Cover rings 11 and 12 are provided at opposite axial ends of the guide vane structure 9 and are interconnected by the guide vanes 10. The axial length 15 of the guide vanes 10 corresponds to the axial length 16 of an annular space 8 for receiving the guide vane structure 9. At the end of the slide sleeve 2 remote from the guide vane structure 9, the slide sleeve 2 includes slide lugs 6 by means of which the axial slide sleeve 2 is guided in guide grooves 7 of the flow guide structure 4 for axial movement. At their axial ends, the slide lugs 6 are for example in contact with a slide member 5 for pushing the slide sleeve 2 into the annular space 8 or retracting it from the annular space 8 (FIG. 2). When the axial slide sleeve 2 is inserted into the annular space 8, the cover ring 11 is fittingly received in a recess 19 in the turbine housing 1 so that a smooth transition is formed between the wall for the inlet passage 13 and the inner radial wall of the cover ring 11 so that the exhaust gas flow through the annular space 8 is not disturbed by the cover ring 11. The exhaust gases are then only redirected by the guide vanes 10, which fully extend over the axial length of the annular space 8. In this connection, it is expedient if the edges 20 and 21 of the cover rings 11 and 12 facing the guide vanes 10 at their upstream ends are rounded and/or provide for a smooth transition with the contour (18) of the inlet flow passage FIG. 2). In the retracted position of the axial slide sleeve 2 (FIG. 1), the cover ring 11 is moved into the annular space 8 to such an extent that its contour 17 remote from the guide vanes 10 is flush with the contour 18 of the inlet passage 13'.

Figure 3:
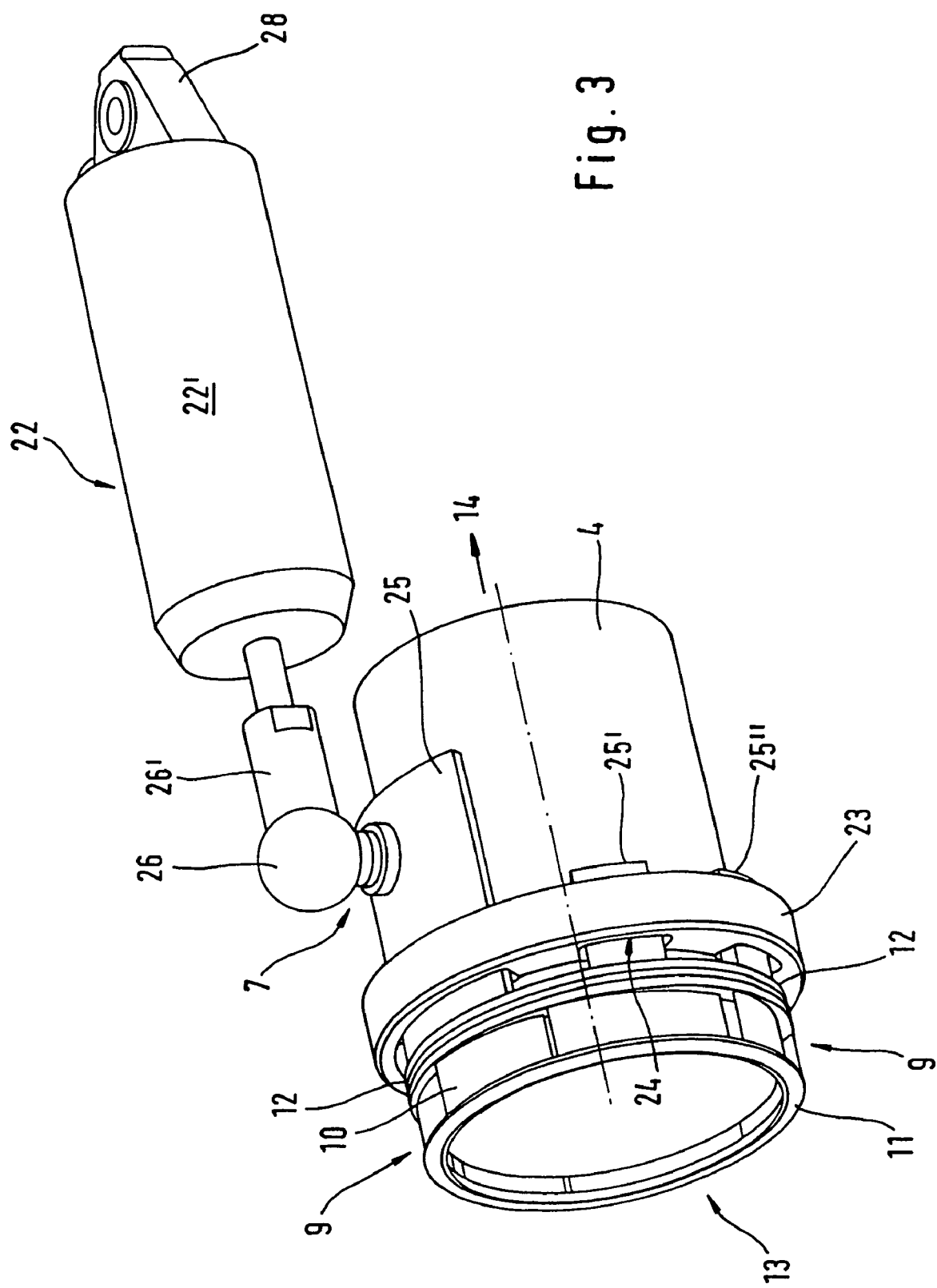
FIG. 3 shows an operating mechanism for an adjustable slide sleeve carrying the guide vane structure.

FIG. 3 shows an operating device 22 comprising an operating cylinder 22', which is connected to a lug 25 connected to the flow guide structure 9. The lug 25 is disposed in the area of the outer circumference of a cylindrical inner turbine housing part 4, which forms the exhaust gas outlet duct 14 and extends co-axially with the turbine. The operating cylinder 22' extends parallel to the turbine axis and is connected to a support structure which is not shown in the drawing by way of an eyelet member 28.

The inner turbine housing part 4 comprises a cylindrical structure surrounded by a ring 23 which is provided with a number of circumferentially spaced axial inner grooves 24 through which one or several of the lugs 25, 25', 25" extend and on which the flow guide structure 9 is mounted. The lugs 25, 25', 25" are connected to the cover ring 12 and are jointly guided in the grooves 24.

One of the lugs is enlarged (lug 25) and is pivotally connected, by way of a ball joint 26, to the piston rod 26' of the operating cylinder 22' of the operating device 22 for the position adjustment of the guide vane structure 9.

The individual lugs 25, 25' 25" are disposed, equally spaced around the inner housing part 4 and connected, at their front ends, to the guide vane ring 12 of the guide vane structure 9. The guide vane structure 9 comprises an outer and an inner cover ring 11, 12 which are interconnected by the plurality of guide vanes 10.

The retaining ring 23 surrounding the inner part 4 forms a support structure for the lugs 25, 25' and 25", which are connected to the guide vane structure 9 and adjustably disposed on the inner housing part 4 so that the guide vane structure 9 can be adjusted by the operating cylinder 22'. The retaining ring 23 is firmly mounted at only a small distance from the guide vane structure 9 to provide for accurate and firm support of the guide vane structure 9 during movement thereof into, and out of, the turbine inlet space 8 by the piston rod 26'.

What is claimed is:

1. An exhaust, gas turbine for a turbocharger of an internal combustion engine including a turbine housing (1) having an inlet passage for conducting exhaust gas onto a turbine wheel (T) supported in the housing (1), a guide vane structure (9) supported in said housing so as to be movable axially into, and out of, an annular space (8) of said inlet passage surrounding the turbine wheel (T), and an operating mechanism (22) for moving the guide vane structure (9), said operating mechanism (22) comprising an operating cylinder (22') disposed in parallel axial alignment with the guide vane structure (9), a support ring (23) co-axially surrounding an inner sleeve (4) and having circumferentially spaced axial passages (24) with lugs (25, 25', 25") extending through the passages so as to be axially guided therein, said lugs being connected at one of their ends to the guide vane structure (9) and at least one of the lugs (25) being connected at the other end thereof to the operating mechanism (22), at least said one of the lugs (25) being provided with a joint (26) and the operating cylinder (22') having a piston rod (26') connected to the at least one lug (25) by way of the joint (26).

2. An exhaust gas turbine according to claim 1, wherein the flow guide vane structure (9) is a guide vane ring connected to the lugs.

3. An exhaust gas turbine according to claim 2, wherein the guide vane ring (9) comprises first and second axially spaced cover rings (11, 12) and guide vanes (10) extend between the spaced cover rings (11, 12) and interconnect the spaced cover rings (11, 12).

4. An exhaust gas turbine according to claim 3, wherein the turbine housing is provided at opposite sides of the annular space (8) with a recess (19) and, respectively, an annular gap (3) for receiving the cover rings (11, 12) in the extended and, respectively, retracted positions thereof.

5. An exhaust gas turbine according to claim 4, wherein the turbine wheel (T) is rotatably supported in the turbine housing (1) which includes the inlet passage which is spiral-shaped with ai* the annular space (8) disposed between the spiral inlet passage and the turbine wheel and the guide vane ring (9) is slidable into the annular space (8) such that the guide vane ring (9) is disposed with the guide vanes (10) extending between the spaced cover rings which are outer and inner cover rings (11, 12) in the annular space (8), the turbine housing (1) having a recess (19), and respectively, an annular gap (3) at opposite sides of the annular space (8), the recess being provided for receiving the outer cover ring (11) in the extended position of the guide vane ring (9) while the inner cover ring (12) is received in the annular gap (3) in the retracted position of the guide vane structure (9), the outer cover ring and the inner cover ring (12) having contours corresponding to the adjacent contour of the inlet passage walls.

6. An exhaust gas turbine according to claim 1, wherein the joint (26) is a ball joint which interconnects the at least one lug (25) and the piston rod (26') of the operating cylinder (22').

7. An exhaust gas turbine according to claim 1, wherein the support ring (23) is arranged closely adjacent the quide vane structure (9).

* * * * *